United States Patent
Hughes et al.

(10) Patent No.: US 11,170,232 B2
(45) Date of Patent: Nov. 9, 2021

(54) METHOD FOR CAPTURING AN OBJECT IN AN ENVIRONMENTAL REGION OF A MOTOR VEHICLE WITH PREDICTION OF THE MOVEMENT OF THE OBJECT, CAMERA SYSTEM AS WELL AS MOTOR VEHICLE

(71) Applicant: Connaught Electronics Ltd., Tuam (IE)

(72) Inventors: Ciaran Hughes, Tuam (IE); Duong-Van Nguyen, Tuam (IE); Jonathan Horgan, Tuam (IE); Jan Thomanek, Bietigheim-Bissingen (DE)

(73) Assignee: Connaught Electronics Ltd., Tuam (IE)

(*) Notice: Subject to any disclaimer, the term of this patent is extended or adjusted under 35 U.S.C. 154(b) by 236 days.

(21) Appl. No.: 16/322,333

(22) PCT Filed: Jul. 27, 2017

(86) PCT No.: PCT/EP2017/069014
§ 371 (c)(1),
(2) Date: Jan. 31, 2019

(87) PCT Pub. No.: WO2018/024600
PCT Pub. Date: Feb. 8, 2018

(65) Prior Publication Data
US 2019/0197321 A1 Jun. 27, 2019

(30) Foreign Application Priority Data
Aug. 1, 2016 (DE) .................... 10 2016 114 168.2

(51) Int. Cl.
*G06K 9/00* (2006.01)
*G06T 7/70* (2017.01)
(Continued)

(52) U.S. Cl.
CPC .......... *G06K 9/00805* (2013.01); *B60R 11/04* (2013.01); *B60W 30/0956* (2013.01);
(Continued)

(58) Field of Classification Search
CPC ............ G06K 9/00805; G06K 9/00362; G06T 2207/30261; G06T 7/70; B60W 30/0956; B60W 2554/00
See application file for complete search history.

(56) References Cited

U.S. PATENT DOCUMENTS 9,120,484 B1* 9/2015 Ferguson .................. G06T 7/20
10,093,233 B2* 10/2018 Krokel ...................... G06T 7/75
(Continued)

FOREIGN PATENT DOCUMENTS

DE 102010005290 A1 8/2010
JP 2007334511 A * 12/2007
(Continued)

OTHER PUBLICATIONS

Esther B. Meier, Frank Ade ; "Object Detection and Tracking in Range Image Sequences by Separation of Image Features"; 1998; IEEE.*
(Continued)

Primary Examiner — Shaghayegh Azima
(74) Attorney, Agent, or Firm — Osha Bergman Watanabe & Burton LLP

(57) ABSTRACT

The invention relates to a method for capturing an object (9) in an environmental region (8) of a motor vehicle (1) based on a sequence of images (10, 11) of the environmental region (8), which are provided by means of a camera (4) of the motor vehicle (1), including the steps of: recognizing a first object feature (24) in a first image (10) of the sequence, wherein the first object feature (24) describes at least a part of the object (9) in the environmental region (8), estimating
(Continued)

Figure 1:
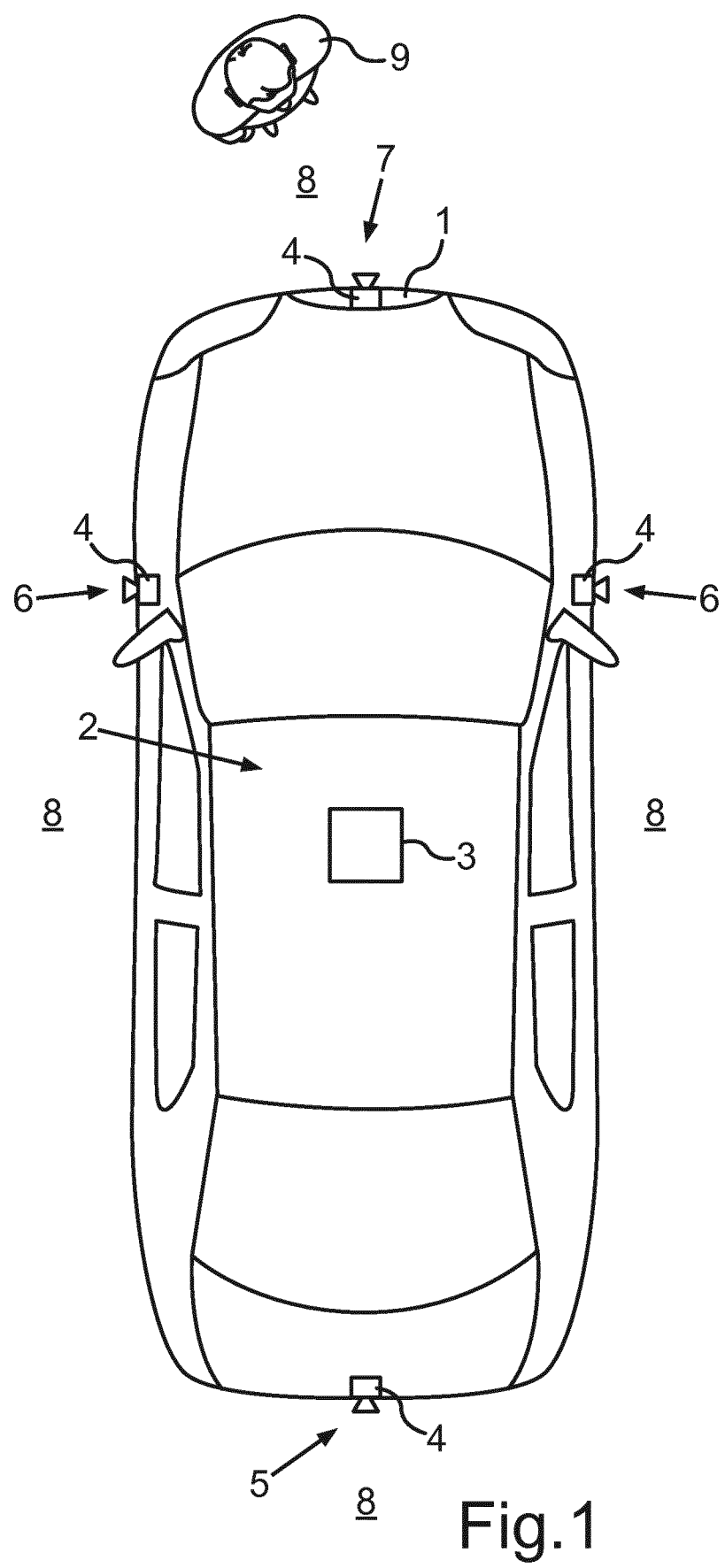

a position of the object (9) in the environmental region (8) based on a predetermined movement model, which describes a movement of the object (9) in the environmental region (8), determining a prediction feature (26) in a second image (11) following the first image (10) in the sequence based on the first object feature (24) and based on the estimated position, determining a second object feature (25) in the second image (11), associating the second object feature (25) with the prediction feature (26) in the second image (11) if a predetermined association criterion is satisfied, and confirming the second object feature (25) as originating from the object (9) if the second object feature (25) is associated with the prediction feature (26).

11 Claims, 11 Drawing Sheets

(51) Int. Cl.
*B60R 11/04* (2006.01)
*B60W 30/095* (2012.01)
(52) U.S. Cl.
CPC ............ *G06K 9/00362* (2013.01); *G06T 7/70* (2017.01); *B60W 2554/00* (2020.02); *G06T 2207/30261* (2013.01)

(56) References Cited

U.S. PATENT DOCUMENTS

| | | | | |
|---|---|---|---|---|
| 10,130,873 | B2* | 11/2018 | Kim | A63F 13/428 |
| 2003/0007074 | A1* | 1/2003 | Nagaoka | H04N 7/18 |
| | | | | 348/148 |
| 2003/0091228 | A1* | 5/2003 | Nagaoka | G06K 9/00805 |
| | | | | 382/154 |
| 2009/0080701 | A1* | 3/2009 | Meuter | G06K 9/3241 |
| | | | | 382/103 |
| 2009/0087088 | A1* | 4/2009 | Chen | G06K 9/4652 |
| | | | | 382/165 |
| 2010/0002908 | A1* | 1/2010 | Miyamoto | G06T 7/215 |
| | | | | 382/103 |
| 2010/0103262 | A1* | 4/2010 | Fardi | G06T 7/00 |
| | | | | 348/148 |
| 2010/0104137 | A1* | 4/2010 | Zhang | G06K 9/4609 |
| | | | | 382/104 |
| 2010/0124358 | A1* | 5/2010 | Huang | G06T 7/254 |
| | | | | 382/103 |
| 2011/0074957 | A1* | 3/2011 | Kiyohara | G06K 9/342 |
| | | | | 348/148 |
| 2013/0223686 | A1* | 8/2013 | Shimizu | G08G 1/166 |
| | | | | 382/103 |
| 2014/0350834 | A1* | 11/2014 | Turk | B60R 1/00 |
| | | | | 701/300 |
| 2015/0146921 | A1* | 5/2015 | Ono | H04N 7/18 |
| | | | | 382/103 |
| 2015/0258991 | A1* | 9/2015 | Fletcher | B60Q 9/008 |
| | | | | 340/435 |
| 2015/0324972 | A1* | 11/2015 | Hayakawa | G06K 9/00805 |
| | | | | 348/148 |
| 2016/0335489 | A1* | 11/2016 | Shigemura | H04N 7/181 |
| 2016/0364619 | A1* | 12/2016 | Ogata | G08G 1/166 |
| 2016/0379074 | A1* | 12/2016 | Nielsen | H04N 7/181 |
| | | | | 348/143 |
| 2017/0061644 | A1* | 3/2017 | Pham | G06K 9/00778 |
| 2017/0140230 | A1* | 5/2017 | Yoshida | G08G 1/166 |
| 2017/0259753 | A1* | 9/2017 | Meyhofer | H04N 13/204 |
| 2017/0280026 | A1* | 9/2017 | Uejima | G06T 7/277 |
| 2017/0329332 | A1* | 11/2017 | Pilarski | B60W 30/0956 |
| 2019/0197321 | A1* | 6/2019 | Hughes | B60R 11/04 |

FOREIGN PATENT DOCUMENTS

| | | | |
|---|---|---|---|
| JP | 2008176555 A | * | 7/2008 |
| WO | 2008/139530 A1 | | 11/2008 |
| WO | 2014096240 A1 | | 6/2014 |
| WO | 2014096242 A1 | | 6/2014 |

OTHER PUBLICATIONS

Andreas Ess, Konrad Schindler, Bastian Leibe and Luc Van Gool; "Object Detection and Tracking for Autonomous Navigation in Dynamic Environments"; IJRR,Sage ;2010.*
Esther B. Meier, Frank Ade; "Object detection and tracking in range image sequences by separation of imeg features"; IEEE, 1998.*
International Search Report and Written Opinion Issued in Corresponding PCT Application No. PCT/EP2017/069014, dated Oct. 9, 2017 (11 Pages).
German Search Report Issued in Corresponding German Application No. 102016114168.2, dated Jun. 7, 2017 (7 Pages).
Esther B. Meier et al, Object Detection and Tracking in Range Image Sequences by Separation of Image Features', IEEE International Conference on Intelligent Vehicles IV'98, Oct. 30, 1998, pp. 176-181, XP055409483, abstract, Sections I, IV, V.
Czyz, J. et al.: A particle filter for joint detection and tracking of color objects. In: Image and Vision Computing 2006, S. 1-11.
Dollàr, P. et al.: Pedestrian Detection: An Evaluation of the State of the Art. In: IEEE Transactions on Pattern Analysis and Machine Interlligence, vol. 34,No. 4, Apr. 2012, S. 743-761.
Zuther, S.: Multisensorsystem mit schmalbandigen Radarsensoren zum Fahrzeugseitenschutz. Dissertation, Fakultät für Ingenieurwissenschaften und Informatik der Universität Ulm, 2014.
Bertozzi M Et Al., "Pedestrian Localization and Tracking System with Kalman Filtering", Intelligent Vehicles Symposium, 2004 IEEE Parma, Italy, Jun. 14-17, 2004, Piscataway, NJ, USA, IEEE, Jun. 14, 2004, pp. 584-589, XP010727712, DOI: 10.1109/IVS.2004. 1336449, ISBN: 978-0-7803-8310-4 abdstract, Sections I, II.C, II.E, III.
Anonymous, "Blob Tracking", RoboRealm Vision for Machines, Apr. 29, 2016, XP055409455, web.archive.org, Retrieved from the Internet: URL: http://web.archive.org/web/20160429233157/Http:// www.roborealm.com/help/Blob_Tracking.php (retrieved Sep. 25, 2017) p. 1, Paragraph 1—p. 2222, Paragraph 4.
The Notice of Preliminary Rejection issued in corresponding Korean Application No. 10-2019-7003274, dated Mar. 30, 2020 (12 pages).

* cited by examiner

METHOD FOR CAPTURING AN OBJECT IN AN ENVIRONMENTAL REGION OF A MOTOR VEHICLE WITH PREDICTION OF THE MOVEMENT OF THE OBJECT, CAMERA SYSTEM AS WELL AS MOTOR VEHICLE

The present invention relates to a method for capturing an object in an environmental region of a motor vehicle based on a sequence of images of the environmental region, which are provided by means of a camera of the motor vehicle. Moreover, the present invention relates to a camera system for performing such a method as well as to a motor vehicle with such a camera system.

Camera systems for motor vehicles are already known from the prior art in various configuration. As is known, such a camera system includes a camera, which is arranged at the motor vehicle and which captures an environmental region of the motor vehicle. The camera system can also have multiple such cameras, which can capture the entire environment around the motor vehicle. The camera arranged at the motor vehicle provides a sequence of images of the environmental region and thus captures a plurality of images per second. This sequence of images can then be processed with the aid of an electronic image processing device. Thus, objects in the environmental region of the motor vehicle can for example be recognized.

Herein, it is required that the objects in the images provided by the camera are reliably recognized. Herein, it is required that the objects, thus for example further traffic participants or pedestrians, can be differentiated from further objects in the environmental region. Herein, the capture of moved objects in the environmental region in particular presents a challenge. Since these moved objects are located in different positions in the temporally consecutive images, it is required to recognize the objects in the individual images.

Hereto, WO 2014/096240 A1 describes a method for detecting a target object in an environmental region of a camera based on an image of the environmental region provided by means of the camera. Therein, a plurality of characteristic features is determined in the image, wherein it is differentiated between ground features describing a ground of the environmental region and target features associated with a target object. Therein, at least a partial region of the image can be divided into a plurality of image cells. In the respective image cells, the associated optical flow vector can then be determined to each characteristic feature. Subsequently thereto, the image cells can be combined to a region of interest.

Moreover, WO 2014/096242 A1 describes a method for tracking a target object in an environmental region of a motor vehicle based on a sequence of images of the environmental region, which are provided by means of a camera of the motor vehicle. Therein, the target object is detected in the environmental region and the target object is tracked by determining optical flow vectors to the target object based on the sequence of images during a relative movement between the motor vehicle and the target object. If a standstill state, in which both the motor vehicle and the target object come to a standstill, is detected, the current relative position of the target object with respect to the motor vehicle is stored and it is examined if a predetermined criterion with respect to the relative movement is satisfied. After the predetermined criterion is satisfied, the tracking of the target object is continued starting from the stored relative position.

It is the object of the present invention to demonstrate a solution, how in particular moved objects in an environmental region of a motor vehicle can be more reliably captured with the aid of a camera.

According to the invention, this object is solved by a method, by a camera system as well as by a motor vehicle having the features according to the respective independent claims. Advantageous developments of the present invention are the subject matter of the dependent claims.

In an embodiment of a method for capturing an object in an environmental region of a motor vehicle based on a sequence of images of the environmental region, which are provided by means of a camera of the motor vehicle, a first object feature is in particular recognized in a first image of the sequence, wherein the first object feature preferably describes at least a part of the object in the environmental region. Furthermore, a position of the object in the environmental region is in particular estimated based on a predetermined movement model, which describes a movement of the object in the environmental region. Moreover, a prediction feature is in particular determined in a second image following the first image in the sequence based on the first object feature and based on the estimated position. Further, a second object feature is preferably determined in the second image. Moreover, association of the second object feature with the prediction feature is preferably effected in the second image if a predetermined association criterion is satisfied. Finally, the second object feature is preferably confirmed as originating from the object if the second object feature is associated with the prediction feature.

A method according to the invention serves for capturing an object in an environmental region of a motor vehicle based on a sequence of images of the environmental region, which are provided by means of a camera of the motor vehicle. The method involves recognizing a first object feature in a first image of the sequence, wherein the first object feature describes at least a part of the object in the environmental region. Furthermore, the method includes estimating a position of the object in the environmental region based on a predetermined movement model, which describes a movement of the object in the environmental region. Moreover, it is provided that a prediction feature is determined in a second image following the first image in the sequence based on the first object feature and based on the estimated position. Furthermore, the method includes determining a second object feature in the second image and associating the second object feature with the prediction feature in the second image if a predetermined association criterion is satisfied. Finally, the method involves confirming the second object feature as originating from the object if the second object feature is associated with the prediction feature.

With the aid of the method, objects and in particular moved objects are to be recognized in the environmental region of the motor vehicle. The method can be performed by a camera system of the motor vehicle, which has at least one camera. A sequence of images of the environmental region is provided by this camera. Thus, the sequence describes a temporal succession of images captured for example with a predetermined repetition rate. Further, the camera system can have an image processing unit, by means of which the images can be evaluated. Therein, it is first provided that a first object feature is recognized in a first image of the sequence of images. This first object feature can completely describe the object in the environmental region. It can also be provided that the first object feature only describes a part of the object in the environmental region.

Basically, it can be provided that multiple first object features are determined, which all describe the object in the environmental region. The first object feature can in particular describe the position of the part of the object and/or the dimensions of the part of the object in the first image. Moreover, it is provided that the movement of the object in the environmental region is estimated. Hereto, a predetermined movement model is used, which describes the movement of the object in the environmental region of the motor vehicle, thus in the real world. The movement model can for example describe a linear movement of the object into a predetermined direction. Based on the movement model, the position of the object in the environmental region can be continuously estimated.

Therein, it is provided that the position is estimated for that point of time, at which a second image of the sequence is or has been captured. In this second image, which follows the first image in the sequence of images, a prediction feature is then determined. The prediction feature can be determined based on the first object feature. For example, for determining the prediction feature, the first object feature from the first image can be used and be shifted such that the position of the prediction feature in the second image describes the estimated position in the environmental region. Thus, the estimated variation of the position of the object is transferred into the second image.

In the second image, a second object feature is then recognized. This second object feature also describes at least a part of the object in the environmental region of the motor vehicle in analogous manner to the first object feature. Thus, the second object feature is determined analogously to the first object feature. Moreover, it is examined if the second object feature can be associated with the prediction feature. Thus, it is examined to what extent the second object feature corresponds with the prediction feature, to the determination of which the movement model in the real world was used. If a predetermined association criterion is satisfied, the second object feature is associated with the prediction feature in the second image. The association criterion can for example describe, how similar the second object feature and the prediction feature are to each other. If the second object feature has been associated with the prediction feature in the second image, it can be assumed that the second object feature also describes the object in the environmental region. Since the association of the second object feature with the prediction feature has been effected, it can be assumed that the object has moved according to the predetermined movement model. Thus, it can also be assumed with high likelihood that the first object feature in the first image and the second object feature in the second image describe the same object in the environmental region of the motor vehicle. Thus, the object can be reliably recognized and tracked over the sequence of images.

Preferably, the object is recognized as moving relative to the motor vehicle if the second object feature is confirmed as originating from the object. If the second object feature is confirmed, it can be assumed with relatively high likelihood that the second object feature describes the object or at least a part thereof. This means that the position of the first object feature in the first image has varied to the second object feature in the second image as it was predicted according to the movement model, which describes the movement of the object in the real world. Thereby, the object can be identified or classified as a moved object. This applies both to the case that the motor vehicle itself moves or to the case that the motor vehicle stands still.

According to a further embodiment, an association probability between the second object feature and the prediction feature is determined and the predetermined association criterion is deemed as satisfied if the association probability exceeds a predetermined value. Basically, it can be provided that multiple object features are recognized in the images and a prediction feature is then determined for each of the recognized object features in the image following in the sequence. For the second object feature and the associated prediction feature, the association probability is then determined. The association probability in particular describes the similarity between the second object feature and the prediction feature. If the second object feature and the prediction feature are identical, the association probability can be 100% or have the value of 1. If the second object feature and the prediction feature completely differ, the association probability can be 0% or have the value of 0. If the association probability now exceeds a predetermined value or a threshold value, the second object feature can be associated with the prediction feature. The predetermined value or the threshold value can for example be 75% or 0.75. Thus, it can be examined in simple manner if the second object feature can be associated with the prediction feature.

Furthermore, it is advantageous if the association probability is determined based on an overlap between the second object feature and the prediction feature in the second image and/or based on dimensions of the second object feature and the prediction feature in the second image and/or based on a distance between the centers of gravity of the second object feature and the prediction feature in the second image and/or based on a distance between the object and a prediction object associated with the prediction feature in the environmental region. Both the second object feature and the prediction feature can cover a certain shape or a certain area in the second image. In particular, it is provided that both the second object feature and the prediction feature are determined as a polygon. Basically, the second object feature and the prediction feature can also be determined as another geometric shape. Herein, it can be determined on the one hand to what extent the second object feature and the prediction feature overlap in the second image. If the second object feature and the prediction feature overlap in a relatively large area, a high association probability can be assumed. If the second object feature and the prediction feature do not overlap, a low association probability can be assumed. The examination to what extent the second object feature and the prediction feature overlap is therein effected in the second image.

Alternatively or additionally, the respective dimensions of the second object feature and the prediction feature can be considered in the second image. Therein, the lengths, the heights and/or the areas of the second object feature and the prediction feature can be compared to each other. In this manner too, the similarity between the second object feature and the prediction feature in the second image or the association probability can be determined. Furthermore, it can be provided that the center of gravity of the second object feature and the center of gravity of the prediction feature are determined and a distance between the center of gravity of the second object feature and the center of gravity of the prediction feature is determined. The lower the distance between the centers of gravity is, the greater the association probability is. Furthermore, it can be provided that a prediction object is determined, which describes the mapping of the prediction feature into the real world. In the real world or in the environmental region of the motor vehicle, the distance between the object and the prediction object can now be determined. The lower this distance is, the higher the association probability is. Thus, both in the images and in the real world, it can be examined how great the correspondence between the object features and the object in the real world, which follows the movement model, is.

In a further configuration, if the association of the second object feature with the prediction feature is omitted, an association probability between a last confirmed object feature and the second object feature is determined, wherein the last confirmed object feature describes that object feature, which was last confirmed as originating from the object. If the association probability between the second object feature and the prediction feature falls below the determined value, the second object feature is not associated with the prediction feature. This can be substantiated in that the object in the environmental region does not or no longer move according to the movement model. This is for example the case if the object has stopped or has halted or has changed a direction of movement. If moved elements in the second image are used for determining the second object feature, it can be the case that the second object feature cannot or not sufficiently be determined if the object stands still during the capture of the second image. Thus, the second object feature for example cannot be determined at all. In this case too, association of the second object feature with the prediction feature is not possible. If the association of the second object feature with the prediction feature has not been effected, it is examined if the second object feature can be associated with that object feature, which was last confirmed as originating from the object in one of the preceding images. Thus, it can be determined, where the second object feature is relative to the position, in which the object has certainly been at an earlier point of time. Based on this information, it can be determined if the object in the environmental region has changed its direction, has changed its speed of movement or currently stands still.

Furthermore, it is advantageous that the prediction feature is determined starting from a position in the environmental region, which is associated with the last confirmed object feature if the association probability between the last confirmed object feature and the second object feature is greater than the association probability between the second object feature and the prediction feature. Basically, the association probability to the second object feature in the second or in the current image and the association probability to that object feature from one of the preceding images can be determined, which was actually confirmed as originating from the object. If the object in the environmental region does no longer follow the predetermined movement model, it is required to change the movement model. Therein, it is in particular provided that the movement model is determined starting from that object feature, which was last confirmed. Thus, the case can be reliably taken into account that the object in the real world has changed its direction of movement or actually stands still.

According to a further embodiment, an object position in the environmental region is determined based on the second object feature, a prediction position in the environmental region is determined based on the prediction feature, a spatial similarity between the object position and the prediction position is determined and a current position of the object in the environmental region is determined based on the association probability and the spatial similarity. Based on the prediction feature, which is determined based on the movement model, a prediction position is determined. This prediction position describes the current position of the object considering the movement model. Therein, the prediction position can be output with a predetermined spatial uncertainty. Based on the second object feature, the current position in the environmental region can also be determined. Based on this object position and the prediction position, a spatial similarity or a spatial likelihood can then be determined. Based on this spatial similarity, a weighting factor can then be determined, based on which the current position of the object can be determined for the tracking. This allows reliably tracking the object.

Furthermore, it is in particular provided that if at least two second object features are associated with the prediction feature, the current position of the object is determined based on the second object feature, the object position of which has the greater spatial similarity to the prediction position of the prediction feature. Basically, it can be the case that multiple object features are respectively determined in the images, but originate from a single object in the real world. If the object in the environmental region is for example a pedestrian, one object feature can describe the head of the pedestrian, another object feature can describe the body and one object feature can respectively describe the legs of the pedestrian. These second object features can then be confirmed as originating from the object. When it now comes to determine the current position of the object in the environmental region or to update the tracking of the object, that second object feature is used, which has the greatest spatial similarity to the prediction feature. For example, the second object feature associated with the head of the pedestrian, can have no or a very low spatial similarity to the prediction feature. However, that second object feature, which is associated with a leg of the pedestrian, can have a high spatial similarity to the prediction feature. This in particular applies to the case in which the base point of the prediction feature is compared to the respective base points of the second object features for determining the spatial similarity. This allows reliable determination of the current position of the object in the environmental region and further reliable tracking of the object.

According to a further embodiment, it is provided that if a further object feature is recognized in one of the images, it is examined if the further object feature originates from an object entered the environmental region, wherein the examination is based on an entry probability depending on a position of the further object feature in the image. Basically, it can be the case that multiple object features are recognized in the images or in the second image. Now, it is to be examined if these object features originate from an already recognized object or if the object feature describes a new object, which was not yet previously captured. Therefore, it is examined if the further object feature describes an object, which has entered the environmental region or which has moved into the environmental region. In the examination, an entry probability is taken into account, which can also be referred to as a birth probability. This entry probability depends on the position of the object feature in the image. Herein, it is taken into account that in the edge areas of the image, the likelihood is high that the object has entered the environmental region, which is depicted in the images. In an area, which is directly in front of or behind the motor vehicle and for example is arranged in a central area of the image, a low entry probability is assumed. For these areas, it is unlikely that the further object has entered this area. If the further object feature has been recognized as originating from a new object, this new object can also be correspondingly tracked or its position can be determined.

Furthermore, it can be provided that it is examined if an object has exited the environmental region. This can for example be the case if the object is tracked in the images and can no longer be recognized in one of the images. For example, this can be the case if the first object feature in the first image is in an edge area of the image and the object feature can no longer be captured in the second image. In this case, an exit probability can be defined analogously to the previously described entry probability and it can be examined based on this exit probability if the object has exited the environmental region. Herein too, it can be taken into account that the exit probability is higher if the object feature is in an edge area of the image than for the case that the object feature is in a central area of the image.

Furthermore, it is in particular provided that the second object feature is determined as a polygon, wherein the polygon has a left base point, a central base point, a right base point and/or a tip point, and wherein the polygon describes a width and/or a height of the object. The second object feature can be described as an object in the second image. Therein, the polygon in particular has the left, the central, the right base point as well as a tip point. Therein, the central base point can be determined as the point of intersection between a connecting line between a vanishing point and the center of gravity of the polygon. The width of the object is reproduced by the right and the left base point. The height of the object can be described by the tip point. This polygon can be determined in simple manner and within a short computing time. In addition, the polygon is suitable for describing the spatial dimensions of the object. Therein, it is in particular provided that a plurality of regions of interest is determined in the second image, the regions of interest are grouped and the respective polygon is determined based on the grouped regions of interest. Regions of interest can respectively be determined in the second image or in the respective images of the image sequence. These regions of interest in particular describe those pixels or areas of the image, which depict a moved object. For example, the image or the second image can first be divided into a plurality of partial areas or image cells and it can be examined for each of the image cells if it depicts a moved object or a part thereof. Herein, a weighting matrix can further be taken into account, in which a first value or a second value is associated with each of the image cells, according to whether or not the respective image cell describes a moved object. Those image cells describing moved objects can then be correspondingly grouped and the regions of interest can be determined herefrom. After the respective regions of interest have been determined, it can be examined if these regions of interest originate from the same object. Thus, it can be determined if the respective regions of interest can be grouped. As soon as the regions of interest have then been grouped, the polygon can be determined based on the area, which the grouped regions of interest occupy in the second image, which then describes the second object feature.

Further, it is advantageous if the second image is divided into a plurality of image cells, object cells describing a moved object are selected from the image cells based on an optical flow and the object cells are associated with one of the regions of interest. As already explained, the second image can be divided into a plurality of image cells. Therein, each of the image cells can include at least one pixel. In particular, it is provided that each of the image cells includes a plurality of pixels. The optical flow or the optical flow vector can then be determined for each of the image cells. Thus, it can be reliably examined whether or not the pixels in the image cell describe a moved object. Those image cells describing a moved object are considered as object cells and can be combined to a region of interest. This allows simple and reliable determination of the respective regions of interest.

Furthermore, it is advantageous if a roadway is recognized in the second image by means of segmentation and the regions of interest are determined based on the recognized roadway. With the aid of a corresponding segmentation method, a roadway, on which the motor vehicle is located, can be recognized in the second image. Therein, the roadway can be in front of the motor vehicle in direction of travel or behind the motor vehicle in direction of travel according to orientation of the camera. In the images describing the environmental region of the motor vehicle, the roadway or the ground can now be recognized with the aid of the segmentation method. If the moved object is also located on the roadway, the boundaries between the roadway and the object moving on the roadway can be reliably determined by recognizing the roadway. This allows precise determination of the regions of interest.

Presently, the determination of the polygons based on the regions of interest was described based on the second object features in the image. The first object feature in the first image and all of the further object features in the images can also be determined as polygons in analogous manner. It is in particular provided that the prediction feature is also determined as a polygon. Therein, the prediction feature can be determined based on the first object feature and the position of the polygon and/or the size of the polygon describing the prediction feature can be adapted based on the movement model in the second image.

A camera system according to the invention for a motor vehicle includes at least one camera and an electronic image processing device. The camera system is adapted to perform a method according to the invention or an advantageous configuration thereof.

A motor vehicle according to the invention includes a camera system according to the invention. The motor vehicle is in particular formed as a passenger car.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 2:
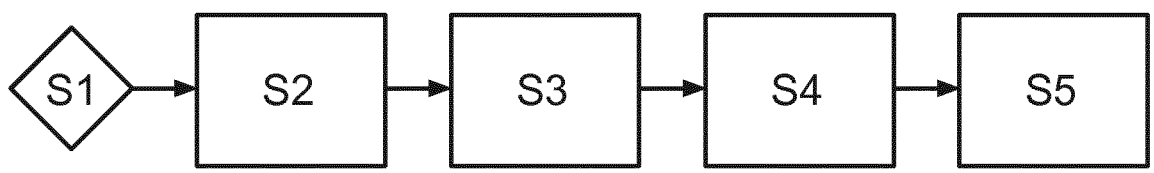
Figure 3:
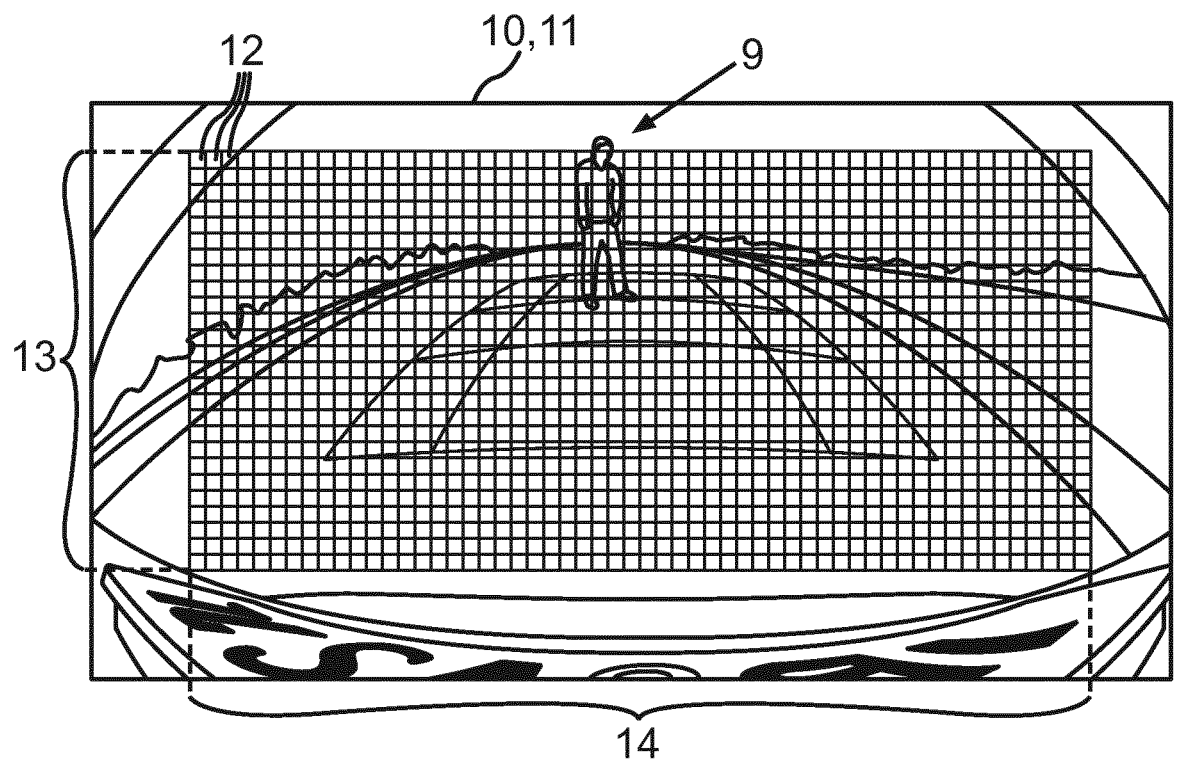
Figure 4:
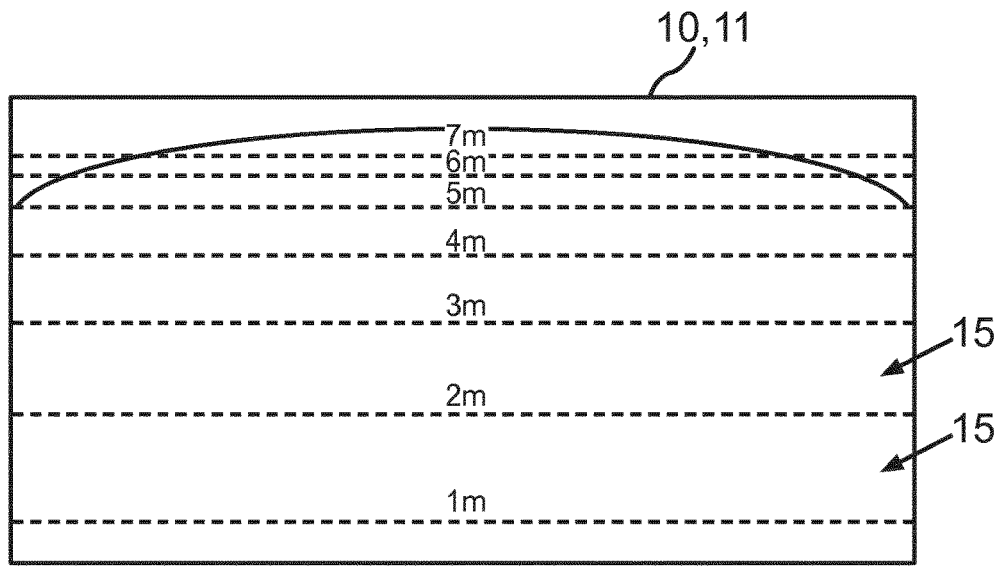
Figure 5:
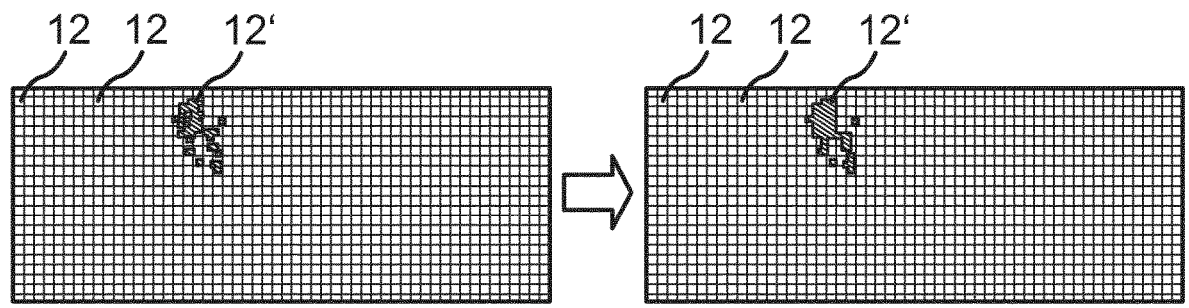
Figure 6:
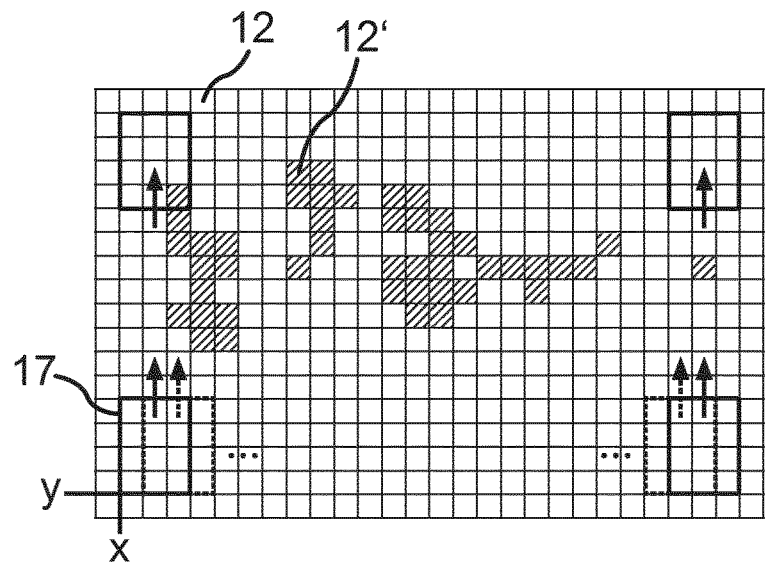
Figure 7:
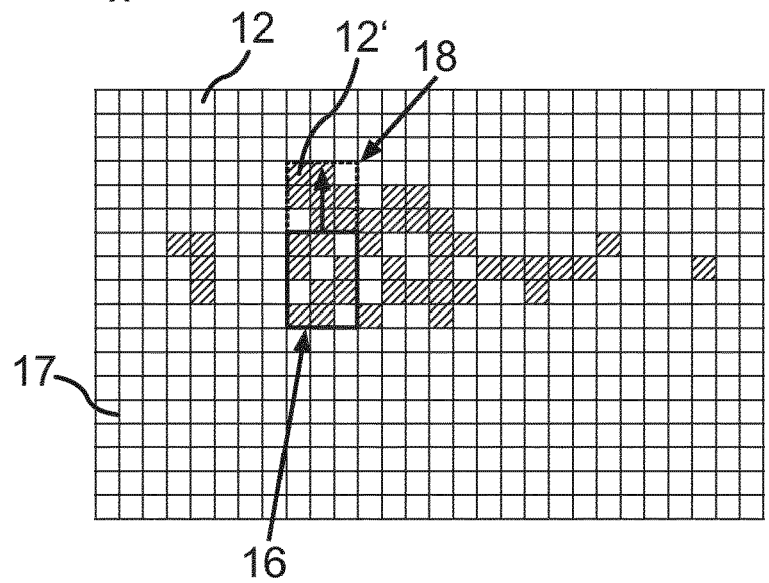
Figure 8:
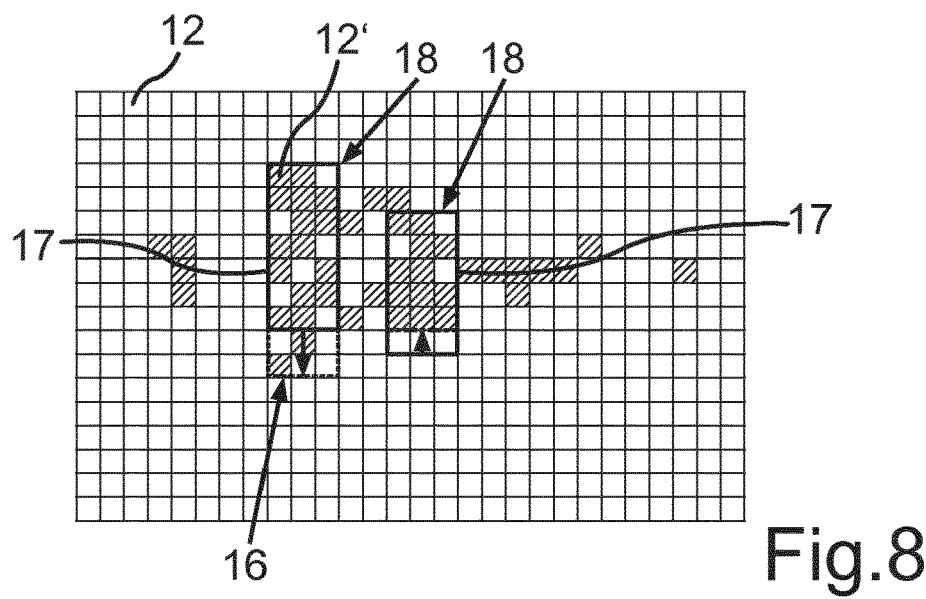
Figure 9:
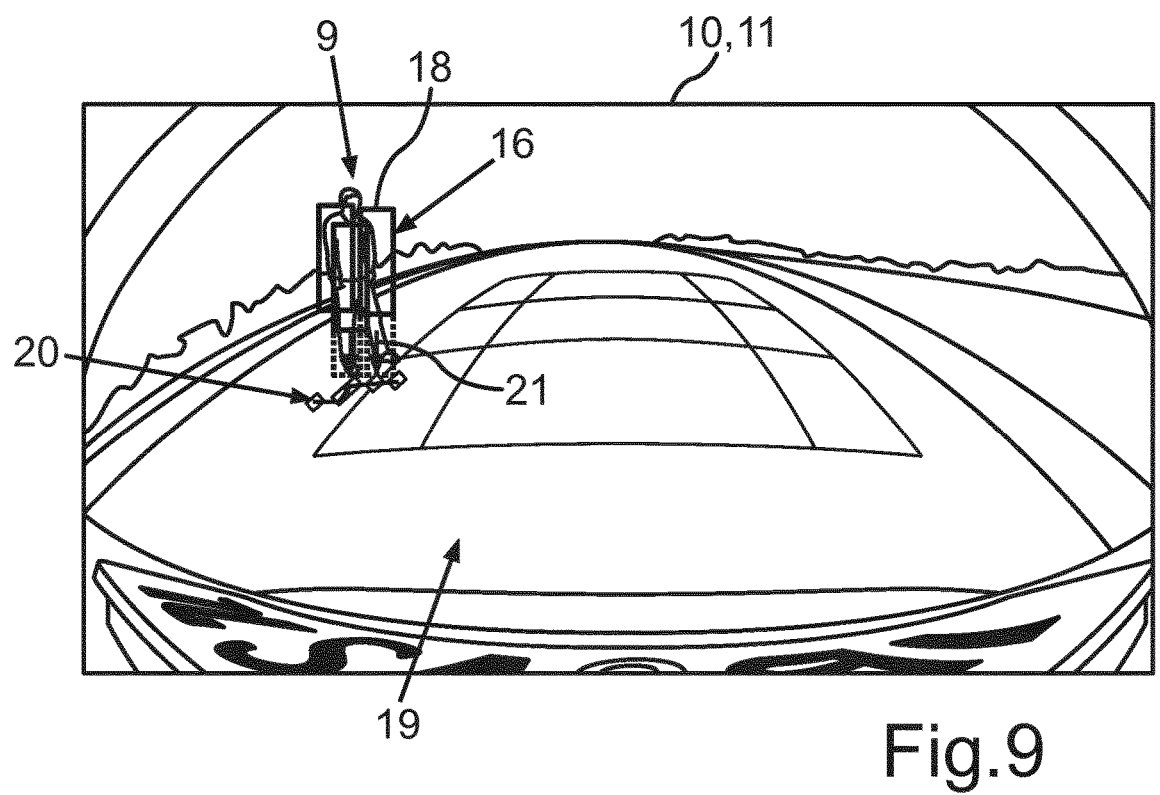
Figure 10:
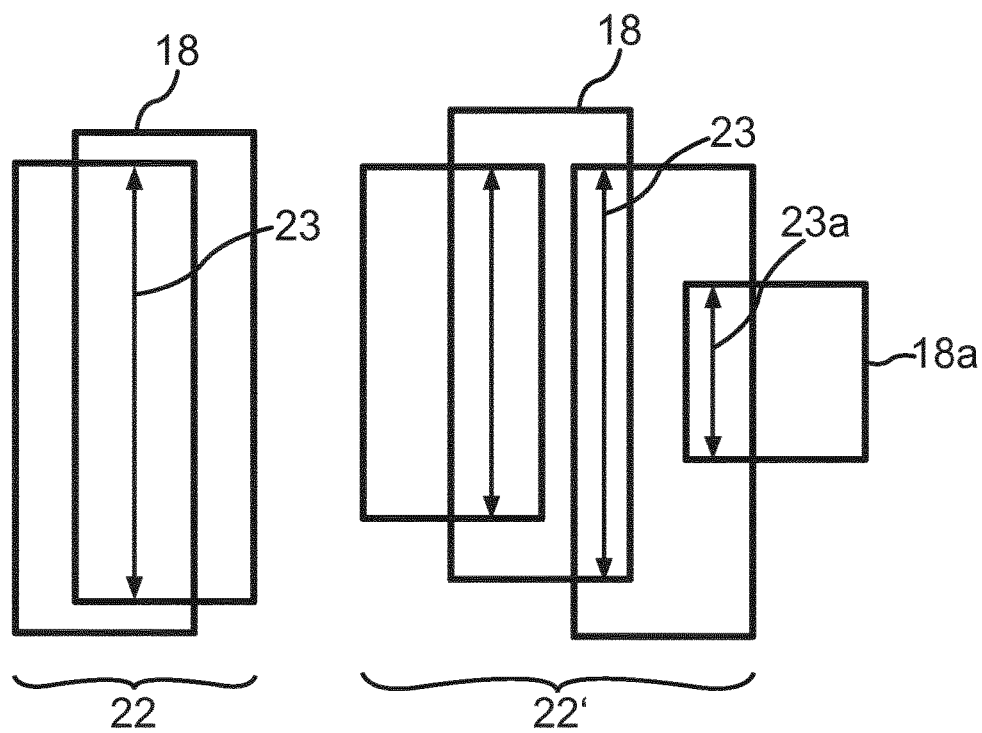
Figure 11:
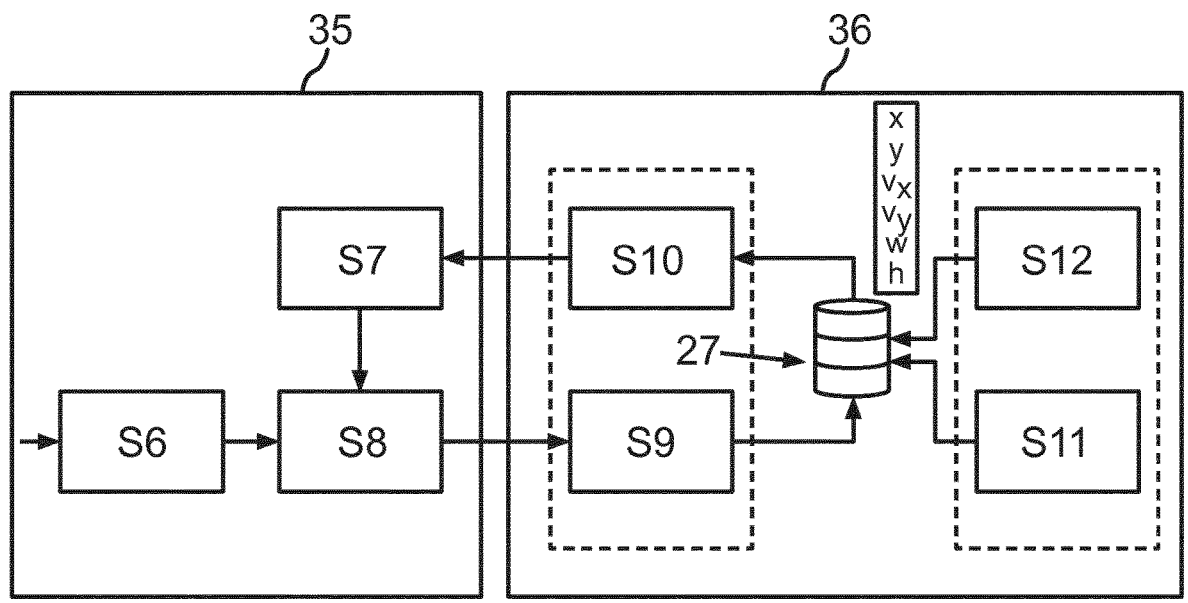
Figure 12:
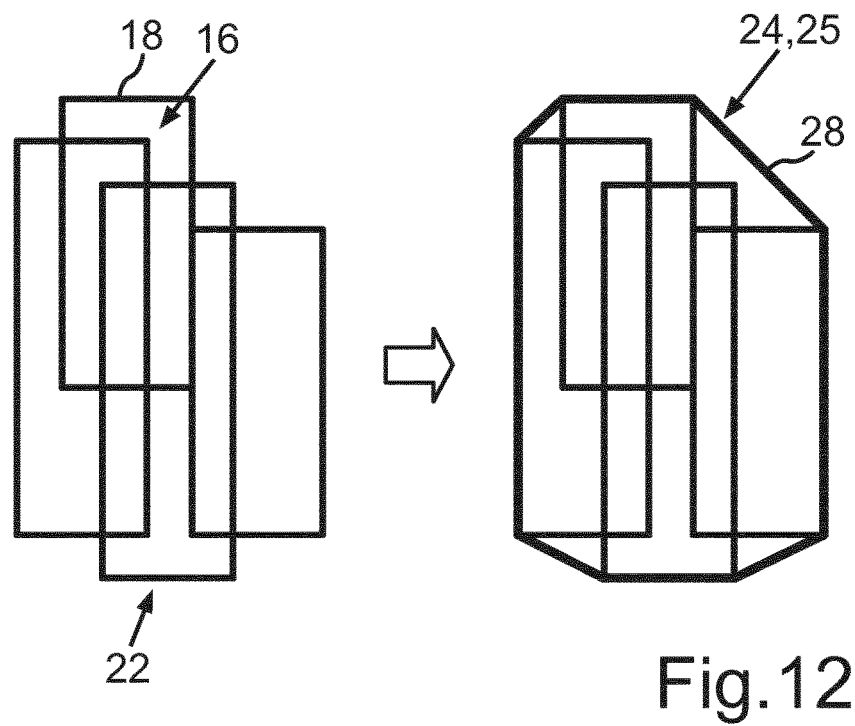
Figure 13:
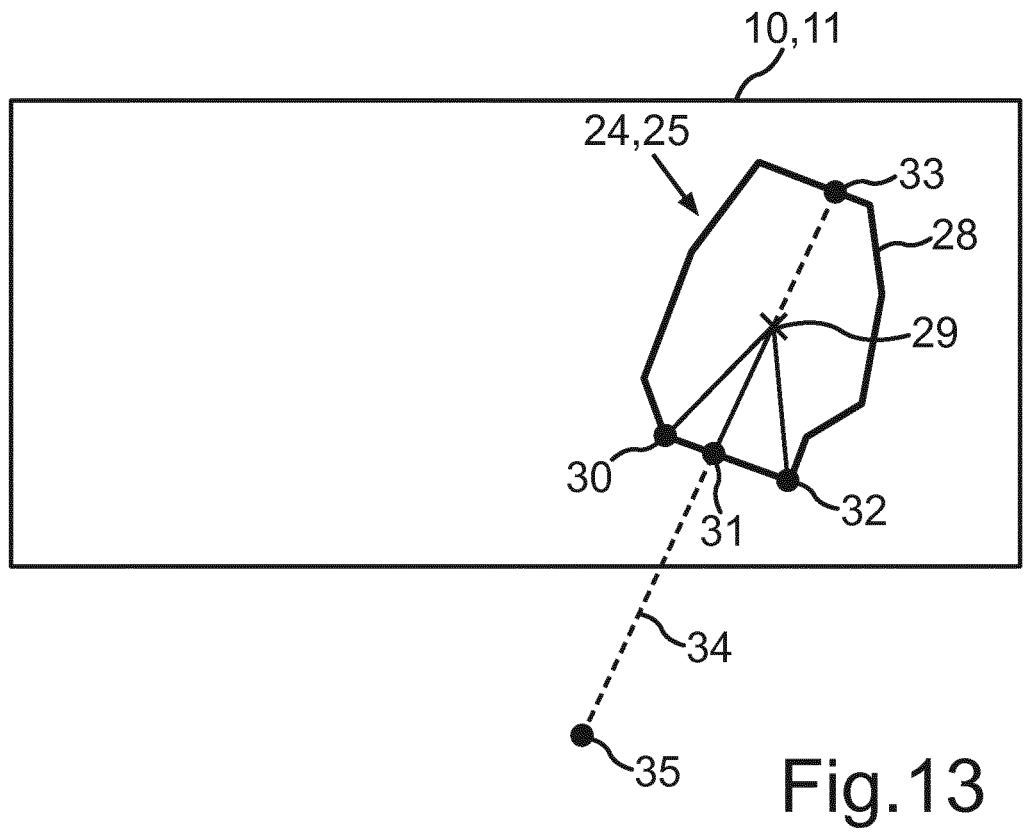
Figure 14:
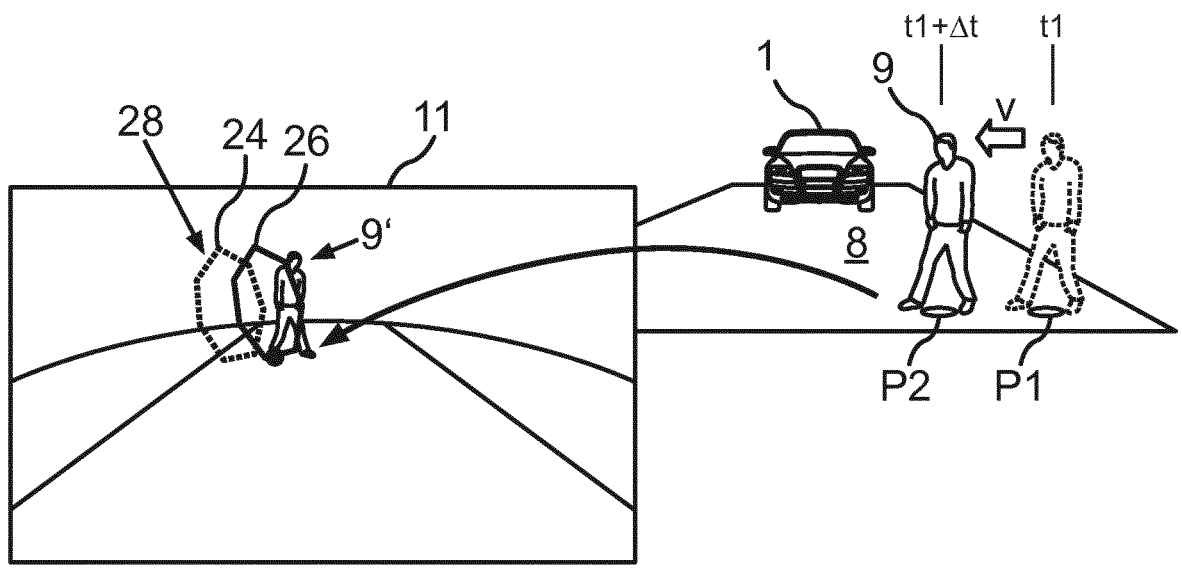
Figure 16:
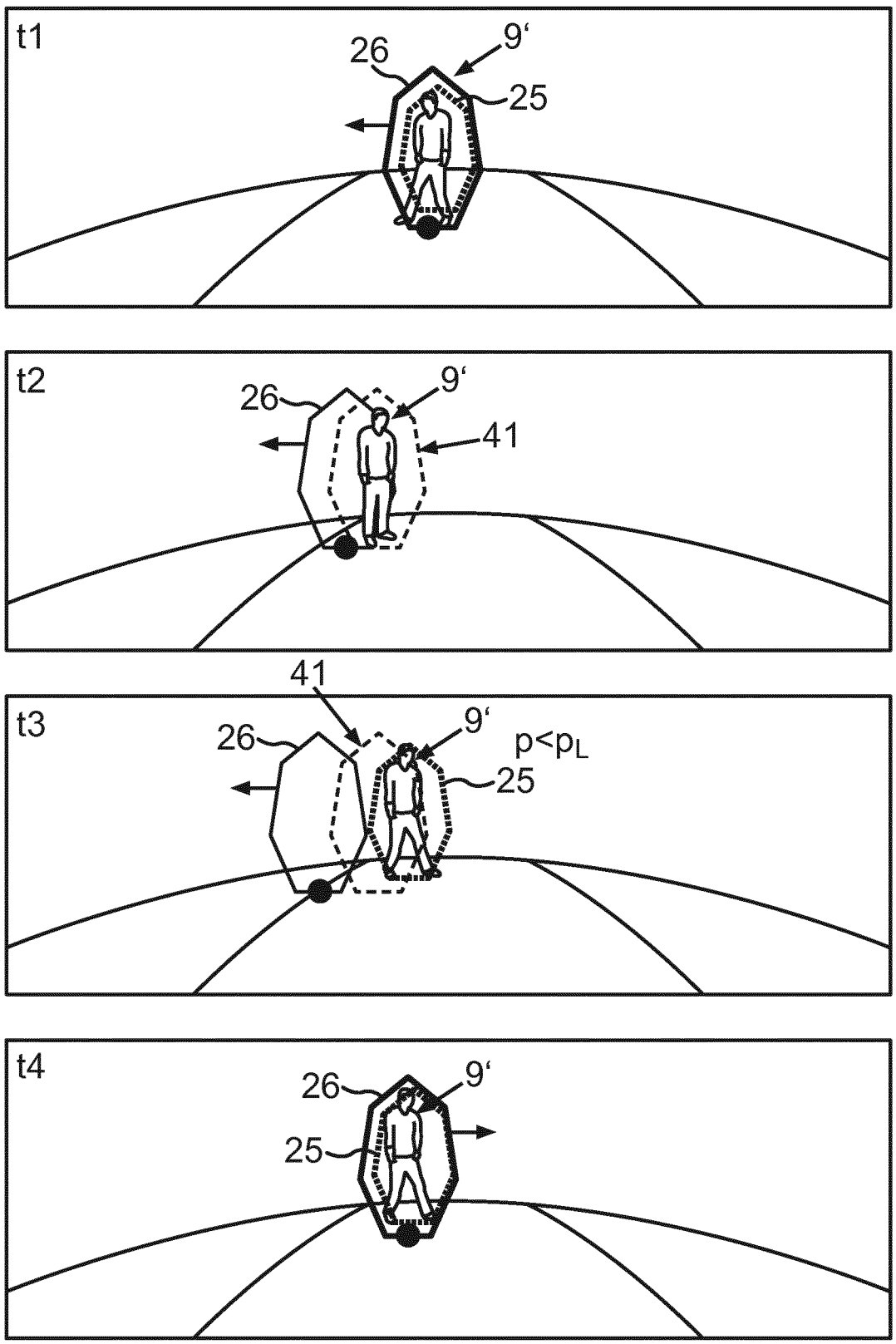
Figure 17:
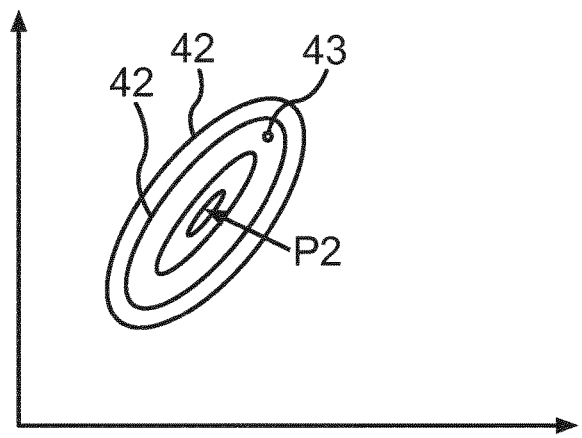
Figure 18:
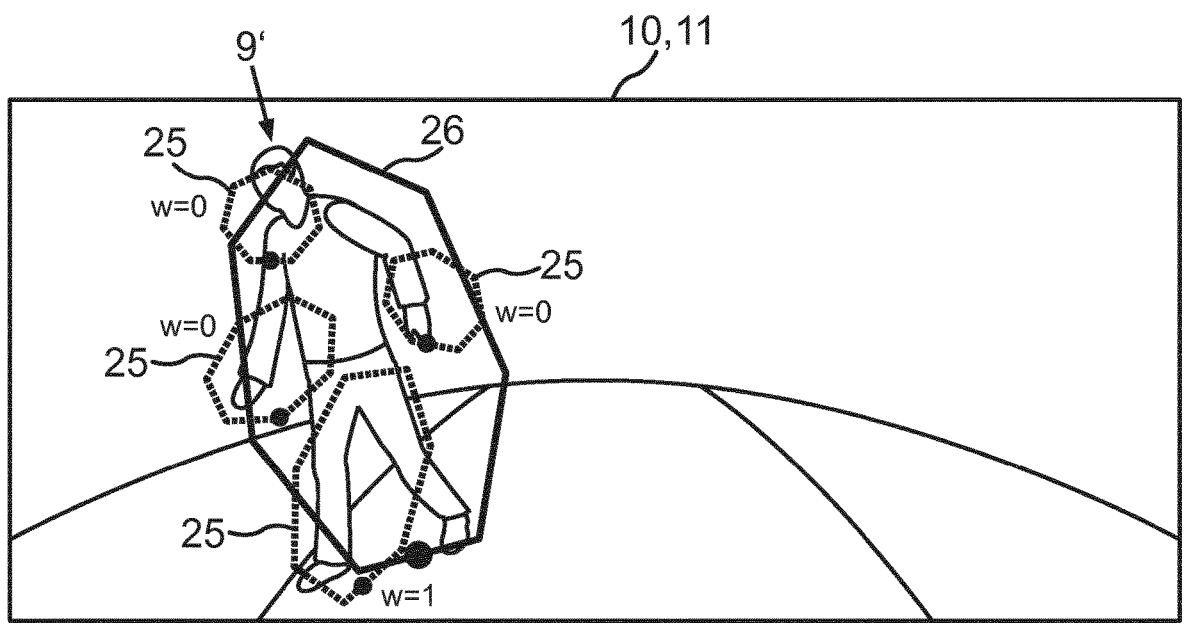
Figure 19:
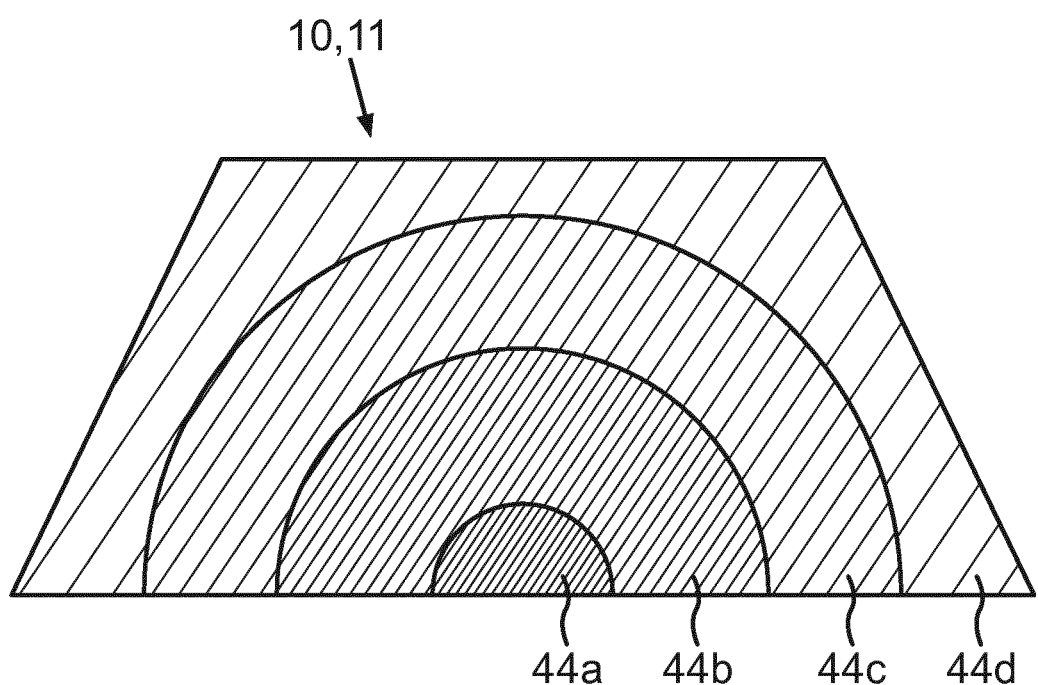

There show:

FIG. 1 a motor vehicle according to an embodiment of the present invention, which has a camera system with a plurality of cameras;

FIG. 2 a schematic flow diagram of a method for determining regions of interest in the images, which are provided by the cameras;

FIG. 3 an image, which is provided with the aid of the cameras, which is divided into a plurality of image cells;

FIG. 4 areas in the image, which are used for determining the regions of interest;

FIG. 5 object cells in the image, which are associated with the moved object, before and after dilation;

FIG. 6 the individual image cells, over which a sliding window is shifted for determining the regions of interest;

FIG. 7 a region of interest in the image, which is upwards corrected;

FIG. 8 two regions of interest in the image, wherein the one region of interest is downwards corrected and the other region of interest is scaled down;

FIG. 9 the regions of interest, which are associated with a pedestrian in the image, who is located on a roadway;

FIG. 10 regions of interest, which are each combined in groups;

FIG. 11 a schematic flow diagram of a method for tracking the object;

FIG. 12 a schematic representation of the determination of a polygon based on grouped regions of interest;

FIG. 13 the polygon, which has a left, a central and a right base point as well as a tip point;

FIG. 14 a schematic representation of the determination of an object feature based on a movement model in the real world;

FIG. 15a-15d object features, which are compared to prediction features;

FIG. 16 object features and prediction features at different points of time;

FIG. 17 a diagram, which describes the spatial similarity between the object and a prediction object in the real world;

FIG. 18 a pedestrian as a moved object, with which a plurality of object features are associated; and FIG. 19 a diagram, which describes an entry probability of an object depending on a position in the image.

In the figures, identical and functionally identical elements are provided with the same reference characters.

FIG. 1 shows a motor vehicle 1 according to an embodiment of the present invention in a plan view. Presently, the motor vehicle 1 is formed as a passenger car. The motor vehicle 1 includes a camera system 2, which includes at least one camera 4. In the present embodiment, the camera system 2 includes four cameras 4, wherein one of the cameras 4 is arranged in a rear area 5, one of the cameras 4 is arranged in a front area 7 and two of the cameras 4 are arranged in respective lateral areas 6 of the motor vehicle 1.

With the aid of the camera system 2, objects 9 in an environmental region 8 of the motor vehicle 1 can be captured. Hereto, a sequence of images 10, 11 is provided by each of the cameras 4. This sequence of images 10, 11 is then transmitted to an electronic image processing device 3 of the camera system 2. The objects 9 in the environmental region 8 can then be recognized in the images 10, 11 with the aid of the electronic image processing device 3.

In particular, moved objects 9 in the environmental region 8 are to be recognized with the aid of the camera system 2. Hereto, a method of three-dimensional image processing is used. As explained in more detail below, first, regions of interest 16 are determined in the images 10, 11, which describe a moved object 9. Subsequently, object features 24, 25 are determined in the images 10, 11 based on the regions of interest 16, which describe the object 9 in more detail. Therein, it is further provided that the movement of the object 9 is tracked.

FIG. 2 shows a schematic flow diagram of a method for determining regions of interest 16 in the images 10, 11. In a first step S1, an image 10, 11 provided by one of the cameras 4 is divided into a plurality of image cells 12. Therein, each of the image cells 12 can include at least one pixel. In particular, it is provided that each of the image cells 12 has a plurality of pixels. For example, each image cell 12 can have 10×10 pixels. Furthermore, object cells 12' are determined. The object cells 12' describe those image cells 12, which describe a moved object 9. In a step S2, a weighting matrix is then determined based on the image cells 12 and the object cells 12'. In a step S3, regions of interest 16 are then determined in the image 10, 11 based on the weighting matrix. These regions of interest 16 are subsequently corrected in a step S4. Finally, the regions of interest 16 are combined in a step S5.

FIG. 3 shows an image 10, 11, which has been provided by one of the cameras 4. Here, it is apparent that the image 10, 11 is divided into a plurality of image cells 12. Therein, the number of the pixels in the respective image cells 12 can be determined. Based on the image cells 12, the weighting matrix can be determined. Therein, a height 13 of the weighting matrix results based on the number of lines of image cells 12 and a width 14 of the weighting matrix results based on the number of columns of the image cells 12.

The image 10, 11 shows the object 9, which is located in the environmental region 8. The object 9 is a moving object in the form of a pedestrian. This object 9 is now to be recognized in the image 10, 11. Hereto, an optical flow or a flow vector is determined in each of the image cells 12, which describes the movement of an object 9. If a flow vector has been determined with a sufficient confidence value, that image cell 12 is recognized as the object cell 12' and identified in the weighting matrix or a value associated with the object cell 12' in the weighting matrix is varied. Therein, the threshold value for a sufficient confidence value depends on the respective region 15 in the image 10, 11. Hereto, FIG. 4 shows different regions 15 in the image 10, 11. Presently, the regions 15 differ depending on a distance to the motor vehicle 1. Further, the threshold values for determining the confidence value can be adjustable and be dependent on the current speed of the motor vehicle 1.

FIG. 5 shows the image cells 12 and the object cells 12', which have been recognized as originating from the moved object 9. On the left side of FIG. 5, it is apparent that the object cells 12' do not form a contiguous area. Since a completely contiguous area has not been recognized in the image 10, 11, a sparsely populated weighting matrix is also present in this area. In order to counter this problem, a morphological operation, in particular the dilation, is applied. Objects in a binary image can be enlarged or thickened by the dilation. Therein, a dilation of the binary weighting matrix W is effected with a structuring element H. This can be described by the following formula:

$$W \oplus H = U_{p \in W} H_p = U_{q \in H} W_q.$$

Therein, $H_p$ describes the structuring element H, which has been shifted by p. $W_q$ describes the weighting matrix W, which has been shifted by q. Herein, q and p describe the directions. Therein, the structuring element H is a 3×3 matrix. The result of the dilation is represented on the right side of FIG. 5. By filling the weighting matrix and the morphological filtering, an integral image of the weighting matrix is determined. The integral image II can be described by the following formula:

$$II(X, Y) = \sum_{x \leq X} \sum_{y \leq Y} W(x, y).$$

Based on the object cells 12', which have been recognized as originating from a moved object 9, regions of interest 16 are now to be determined. This is explained in connection with FIG. 6. Hereto, a generator can be used, which determines an object hypothesis based on the image cells 12, the object cells 12' and the weights thereof. Hereto, a sliding window 17 is used, which is shifted over the individual image cells 12 and object cells 12'. Based on the integral image, thus, each of the weights is determined for each of the regions of interest 16. The weighted sum $w_{ROI}$ can be determined according to the following formula:

$$w_{ROI} = II(x+w, y+h) - II(x+w, y) - II(x, y+h) + II(x, y).$$

Herein, x and y describe the position of the lower left edge of the region of interest, w and h describe the width and the height of the region of interest 16. If the weighted sum $w_{ROI}$ is greater than a threshold value, the region of interest 16 is marked as a hypothesis. If the region of interest 16 is marked as a hypothesis, the search for further regions of interest 16 in the current column is aborted and continued in the next column. As indicated in FIG. 6, this is performed for all of the columns.

For each of the columns, it is examined if a rectangle 18 can be formed from the sliding window 17, which includes the object cells 12'. Therein, it is further provided that the regions of interest 16 are corrected. Hereto, FIG. 7 shows an example, in which the region of interest 16 or the sliding window 17 is upwards corrected. Herein, the upper boundary of the sliding window 17 is upwards shifted such that the object cells 12' associated with the moved object 9 are included in the sliding window 17. The rectangle 18 is then determined from the corrected sliding window 17.

Further, FIG. 8 shows an example, in which the lower boundary of the sliding window 17 is downwards shifted such that all of the object cells 12' are included in the sliding window 17. In addition, a further sliding window 17 is shown, which is scaled down. In this case, object cells 12' are not present in the lowermost line of the sliding window 17. For this reason, the lower boundary of the sliding window 17 is upwards shifted.

Furthermore, it is provided that a roadway 19 is recognized in the image 10, 11. Hereto, a segmentation method is used. The roadway 19 can be recognized in the image 10, 11 with the aid of the segmentation method. Moreover, a boundary line 20 between the roadway 19 and the object 9 can be determined. Based on this boundary line 20, the rectangles 18 describing the regions of interest 16 can then be adapted. In this example, the rectangles 18 are downwards corrected. Presently, this is illustrated by the arrows 21.

Furthermore, it is provided that the respective regions of interest 16 are grouped. This is explained in connection with FIG. 10. Here, the rectangles 18 are apparent, which describe the regions of interest 16. In overlapping rectangles 18, a horizontal contact area 23 is determined in the overlap area. If this horizontal contact area 23 in the overlap area exceeds a predetermined threshold value, the regions of interest 16 are grouped such that groups 22, 22' of regions of interest 16 arise. Hereto, the rectangles 18 or regions of interest 16 on the left side are presently combined to a first group 22 and the rectangles 18 or regions of interest 16 on the right side are combined to a second group. The rectangle 18a of the second group 22' is not added since the horizontal contact area 23a is below the threshold value.

FIG. 11 shows a schematic flow diagram of a method for tracking the object 9 in the environmental region 8. In a step S6, object features 24, 25 are determined based on the regions of interest 16 in the images 10, 11. In a step S7, a prediction feature 26 is determined and in a step S8 the object feature 24, 25 is associated with the prediction feature 26. In a step S9, the position of the object 9 is updated. The updated position is then supplied to an object database 27 describing a state vector. In a step S10, the movement of the object 9 in the environmental region 8 is predicted based on a linear movement model. Based on this movement model, the prediction feature 26 is then determined in the step S7. Furthermore, it is provided that new object features are recognized in a step S11 and object features 24, 25 are no longer taken into account in a step S12.

The association of already existing and tracked objects 9 and newly captured objects is performed both within the images 10, 11 and in the real world. Therein, the steps S6 to S8 are performed within the sequence of images 10, 11. This is illustrated in FIG. 11 by the block 35. The steps S9 to S12 are determined in the real world or in the environmental region 8. This is illustrated in FIG. 11 by the block 36.

The determination of the object feature 24, 25 according to the step S6 is illustrated in FIG. 12. Herein, the individual rectangles 18 are shown, which are associated with the respective regions of interest 16, and which are combined to the group 22. Based on the group 22 of regions of interest 16, a polygon 28 is then determined. Presently, the polygon 28 is determined as the envelope of the rectangles 18, which describe the regions of interest 16. Moreover, a center of gravity 29 of the polygon 28 is determined. The position of the center of gravity 29 of the polygon 28 with the coordinates $x_s$ and $y_s$ can be determined according to the following formulas:

$$x_S = \frac{1}{6A} \sum_{i=0}^{N-1} (x_i + x_{i+1})(x_i y_{i+1} - x_{i+1} y_i),$$

$$y_S = \frac{1}{6A} \sum_{i=0}^{N-1} (y_i + y_{i+1})(x_i y_{i+1} - x_{i+1} y_i).$$

Further, an area A of the polygon 28 can be determined according to the following formula:

$$A = \frac{1}{2} \sum_{i=0}^{N-1} (x_i y_{i+1} - x_{i+1} y_i).$$

Therein, $(x_i, y_i)$, $(x_{i+1}, y_{i+1})$ are coordinates of two adjacent points of the polygon 28. N is the number of points of the polygon 28.

FIG. 13 shows a further representation of the polygon 28. Herein, it is apparent that the polygon 28 has a left base point 30, a central base point 31, a right base point 32 as well as a tip point 33. Moreover, the center of gravity 29 of the polygon 28 is illustrated. The central base point 31 results by the point of intersection of a connecting line 34 connecting a vanishing point 35 to the center of gravity 29 of the polygon 28. By the left base point 30 and the right base point 32, the width of the object 9 is described. The height of the object 9 is described by the tip point 33.

FIG. 14 shows the object 9 in the form of a pedestrian on the right side, which moves with a speed v relative to the motor vehicle 1. The images 10, 11 are provided by at least one camera 4 of the motor vehicle 1, which are presented on the left side of FIG. 14. Therein, a first object feature 24 is determined as the polygon 28 in a first image 10 (not illustrated here). This first object feature 24 describes the object 9, which is in a first position P1 at a point of time t1 in the real world or in the environmental region 8.

In a second image 11, which follows the first image 10 in time, the prediction feature 26 is determined based on the first object feature 24. Presently, a picture 9' of the object 9 or of the pedestrian is shown in the second image 11. The first object feature 24 determined in the first image 10 is presently shown dashed in the second image 11. For determining the prediction feature 26, a linear movement model is used, which describes the speed v of the object 9. Thus, it can be determined, in which position P2 the object 9 is at a point of time t1+Δt.

For describing the movement of the object 9, a Kalman filter is used. Herein, it is assumed that the object 9 moves with a constant speed v. Hereto, a state vector $\hat{x}_{k-1|k-1}$ and a corresponding state matrix $P_{k-1|k-1}$ can be defined:

$$\hat{x}_{k-1|k-1} = A \cdot \hat{x}_{k-1|k-1}$$

$$P_{k|k-1} = A \cdot P_{k-1|k-1} \cdot A^T + Q.$$

Herein, A describes the system matrix. $\hat{x}_{k-1|k-1}$ describes the state vector for the preceding point of time or for the first image 10. $P_{k-1|k-1}$ describes the state matrix for the preceding point of time or for the first image 10. Q is a noise matrix, which describes the error of the movement model and the differences between the movement model and the movement of the object 9 in the real world.

Figure 15A:
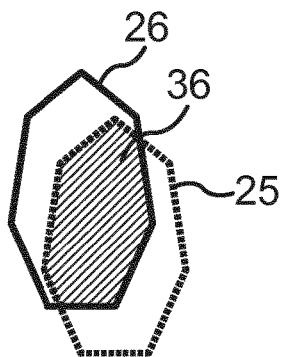
Figure 15B:
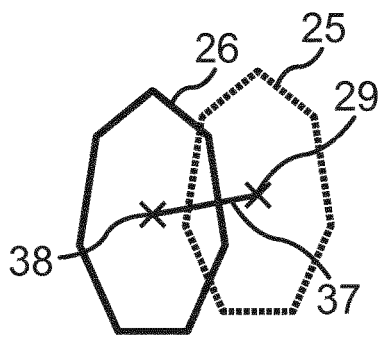
Figure 15C:
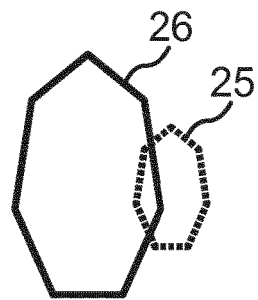
Figure 15D:
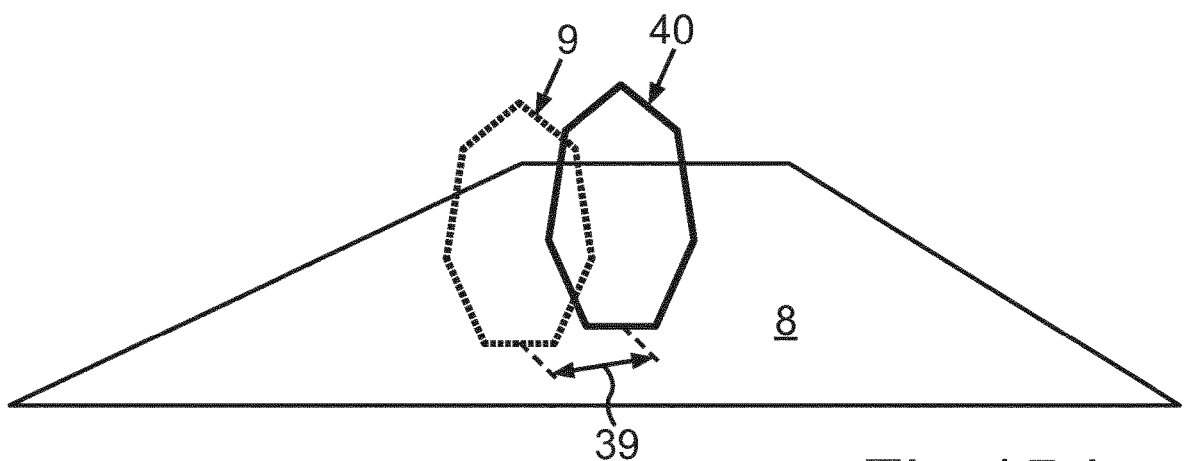

In the second image 11, which follows the first image 10 in time, a second object feature 25 can be determined based on the regions of interest 16. Now, it is to be examined if the second object feature 25 can be associated with the prediction feature 26. Hereto, FIG. 15a to FIG. 15d show different variants, how the association between the second object feature 25 and the prediction feature 26 can be examined. For example—as shown in FIG. 15a—an overlap area 36 between the second object feature 25 and the prediction feature 26 can be determined. Further, a distance 37 between the center of gravity 29 of the second object feature 25 or the polygon 28 and a center of gravity 38 of the prediction feature 26 can be determined. This is illustrated in FIG. 15b. Moreover, a size of the second object feature 25 can be compared to a size of the prediction feature 26. This is illustrated in FIG. 15c. Further, a distance 39 between the object 9 and a prediction object 40 can be determined, which has been determined based on the prediction feature 26 or which maps the prediction feature 26 into the real world.

All of these criteria shown in FIGS. 15a to 15d can be examined to determine a quality level $q_m$, which can have a value between 0 and 1. Overall, an association probability $p_j$ can then be determined, which can be determined according to the following formula:

$$p_j = \Sigma w_m q_m.$$

If the association probability $p_j$ exceeds a predetermined threshold value, the second object feature 25 can be associated with the prediction feature 26. That is, it is confirmed that the second object feature 25 describes the object 9 in the environmental region 8.

In real scenes or traffic situations, it is usually the case that a moved object 9, in particular a pedestrian, changes its direction of movement or its speed. Since the object features 24, 25 have been determined based on the optical flow, it can be the case that an object feature 24, 25 cannot be determined if the object 9 or the pedestrian currently stands still. Further, it can be the case that the moved object 9 changes its direction of movement.

This is illustrated in connection with FIG. 16. At a point of time t1, the picture 9' of the object 9 or of the pedestrian moves to the left. Here, the prediction feature 26, which has been determined based on the movement model, and the second object feature 25, which has been determined based on the regions of interest 16, show a good correspondence. Thus, the second object feature 25 is confirmed as originating from the object 9. At a point of time t2, the object 9 or the pedestrian stops. In this case, a second object feature 25 cannot be determined. Here, the last confirmed object feature 41 is shown, which has been confirmed as originating from the object 9. This corresponds to the second object feature 25, which has been confirmed at the point of time t1. At a point of time t3, the object 9 again moves to the right. Here, a second object feature 25 can be determined. Here, an association probability p between the prediction feature 26 and the second object feature 25 results. In addition, an association probability $p_L$ between the last confirmed object feature 41 and the second object feature 25 is determined. Since the association probability $p_L$ is greater than the association probability p, the movement of the object 9 at a point of time t4 is determined based on the last confirmed object feature 41.

Moreover, it is provided that a spatial similarity between a prediction position P2 describing the position of the object 9 based on the movement model is determined. This is illustrated in FIG. 17. Herein, the prediction position P2 is described by multiple ellipses 42, which describe the spatial uncertainty of the position determination. Moreover, the object position 43 is determined, wherein the object position 43 is determined based on the second object feature 25. Based on the prediction position P2 and the object position 43, a spatial similarity or a spatial likelihood can then be determined. For each associated measurement or for each object feature 24, 25, a state vector and the associated covariance matrix can be determined:

$$\hat{x}_{k|k}^j = \hat{x}_{k|k-1} + K(z_k^j - \hat{z}_k)$$

$$P_{k|k} = P_{k|k-1} - KHP_{k|k-1}.$$

Therein, $z_k$ describes the data vector of the measurement or of the second object feature 25. $\hat{z}_k$ describes the expected data vector. K describes the Kalman gain, which can be determined according to the following formula:

$$K = \frac{P_{k|k-1} H^T}{H P_{k|k-1} H^T + R}.$$

Herein, H describes a measurement matrix for generating the object features 24, 25 based on the movement model, and R describes a noise matrix, which describes the variation of the polygon 28 in the image 10, 11. The system model can then be determined according to the following formula, wherein w describes a weighting factor:

$$\hat{x}_{k|k} = \frac{\sum w_j w^j_{k|k} + k\hat{x}_{k|k-1}}{\sum w_j + k}.$$

FIG. 18 shows an image 11, in which multiple second object features 25 are associated with an object 9 or the picture 9'. Presently, a second object feature 25 is associated with a head of the object 9, two second object features 25 are associated with the arms of the object 9 and a second object feature 25 is associated with the legs of the object 9 or the pedestrian. Based on the spatial similarity, a weighting factor w can be associated with one of the second object features 25. Presently, the second object feature 25 associated with the legs of the object 9 or the pedestrian, has the greatest spatial similarity to the prediction feature 26 or the base point thereof. The weighting factor w of 1 is associated with this second object feature 25. The weighting factor w of 0 is associated with the second object feature 25. Based on this weighting factor w, the current position or the movement of the object can then be updated.

In the images 10, 11, further object features can be recognized. Therein, it is examined if it is a new object or an object 9, which has entered the environmental region 8. Hereto, an entry probability is taken into account. Hereto, FIG. 19 shows a distribution of the entry probability depending on the position of the object feature 24, 25 in the image 10, 11, which describes the environmental region 8. Therein, the areas 44a to 44d describe different entry probability in the image 10, 11. In an edge area 44a, a high likelihood for an entry of a new object arises. In contrast, a very low entry probability arises in a central area 44a of the image 10, 11, which is directly in front of the motor vehicle 1.

If a new object or a new object feature has been recognized in the images 10, 11, this can be correspondingly tracked. In the same manner, it can be determined if an object 9 has exited the environmental region 8 and thus can no longer be captured in the images 10, 11. Here too, an exit probability can be defined analogously to the entry probability.

Overall, thus, moved objects 9 in an environmental region 8 of the motor vehicle 1 can be reliably recognized and tracked.

The invention claimed is:

1. A method for capturing an object in an environmental region of a motor vehicle based on a sequence of images of the environmental region, which are provided by means of a camera of the motor vehicle, comprising:
   recognizing a first object feature in a first image of the sequence, wherein the first object feature describes at least a part of the object in the environmental region;
   estimating a position of the object in the environmental region based on a predetermined movement model, which describes a movement of the object in the environmental region; determining a prediction feature in a second image following the first image in the sequence based on the first object feature and based on the estimated position;
   determining a second object feature in the second image; associating the second object feature with the prediction feature in the second image if a predetermined association criterion is satisfied;
   confirming the second object feature as originating from the object if the second object feature is associated with the prediction feature, wherein an association probability between the second object feature and the prediction feature is determined and the predetermined association criterion is deemed as satisfied if the association probability exceeds a predetermined value; and
   determining an object position in the environmental region based on the second object feature, determining a prediction position in the environmental region based on the prediction feature, determining a spatial similarity between the object position and the prediction position, and determining a current position of the object in the environmental region based on the association probability and the spatial similarity,
   wherein when the association of the second object feature with the prediction feature is omitted, an association probability between a last confirmed object feature and the second object feature is determined,
   wherein the last confirmed object feature describes the object feature which was last confirmed as originating from the object, and
   wherein the prediction feature is determined starting from a position in the environmental region, which is associated with the last confirmed object feature, when the association probability between the last confirmed object feature and the second object feature is greater than the association probability between the second object feature and the prediction feature.

2. The method according to claim 1, wherein the object is recognized as moving relative to the motor vehicle if the second object feature is confirmed as originating from the object.

3. The method according to claim 1, wherein the association probability is determined based on an overlap between the second object feature and the prediction feature in the second image and/or based on dimensions of the second object feature and the prediction feature in the second image and/or based on a distance between the centers of gravity of the second object feature and the prediction feature in the second image and/or based on a distance between the object and a prediction object associated with the prediction feature in the environmental region.

4. The method according to claim 1, wherein when at least two second object features are associated with the prediction feature the current position of the object is determined based on the second object feature, the object position of which has the greater spatial similarity to the prediction position of the prediction feature.

5. The method according to claim 1, wherein when a further object feature is recognized in one of the images, it is examined if the further object feature originates from an object entered the environmental region, wherein the examination is performed based on an entry probability, which depends on a position of the further object feature in the image.

6. The method according to claim 1, wherein the second object feature is determined as a polygon, wherein the polygon has a left base point, a central base point, a right base point and/or a tip point and wherein the polygon describes a width and/or a height of the object.

7. The method according to claim 6, wherein a plurality of regions of interest is determined in the second image, the regions of interest are grouped and the respective polygon is determined based on the grouped regions of interest.

8. The method according to claim 7, wherein the second image is divided into a plurality of image cells, object cells describing a moved object are selected from the image cells based on optical flow, and the object cells are associated with one of the regions of interest.

9. The method according to claim 7, wherein a roadway is recognized in the second image by segmentation and the regions of interest are determined based on the recognized roadway.

10. A camera system for a motor vehicle including at least one camera and an electronic image processing device, wherein the camera system is adapted to perform a method according to claim 1.

11. A motor vehicle with a camera system according to claim 10.

* * * * *